United States Patent
Liang et al.

(10) Patent No.: US 9,300,217 B2
(45) Date of Patent: Mar. 29, 2016

(54) ELECTROLYTIC CAPACITOR-LESS AC/DC CONVERTER AND CONTROLLING METHOD THEREOF

(71) Applicant: National Cheng Kung University, Tainan (TW)

(72) Inventors: Tsorng-Juu Liang, Tainan (TW); Kuan-Wen Lee, Tainan (TW); Yi-Hsun Hsieh, Tainan (TW); Jiann-Fuh Chen, Tainan (TW); Yi-Chien Shen, Tainan (TW)

(73) Assignee: NATIONAL CHENG KUNG UNIVERSITY (TW)

( * ) Notice: Subject to any disclaimer, the term of this patent is extended or adjusted under 35 U.S.C. 154(b) by 0 days.

(21) Appl. No.: 14/582,307

(22) Filed: Dec. 24, 2014

(65) Prior Publication Data

US 2015/0180325 A1 Jun. 25, 2015

(30) Foreign Application Priority Data

Dec. 25, 2013 (TW) .................................. 102148300

(51) Int. Cl.
*H05B 37/02* (2006.01)
*H02M 3/335* (2006.01)
(Continued)

(52) U.S. Cl.
CPC ............ *H02M 3/33546* (2013.01); *H02M 1/15* (2013.01); *H02M 1/4258* (2013.01); *H05B 33/08* (2013.01)

(58) Field of Classification Search
CPC .. H05B 41/282; H05B 41/28; H05B 33/0815; H02M 3/33576; H02M 3/3374

USPC ......... 363/16–20, 21.01, 21.06, 21.12, 21.17, 363/69, 71, 80, 81, 89; 315/169.3, 219, 315/224, 247, 291, 307, 308

See application file for complete search history.

(56) References Cited

U.S. PATENT DOCUMENTS

| | | | | |
|---|---|---|---|---|
| 7,221,111 | B2 * | 5/2007 | Hirosawa .......... | H02M 3/33576 315/194 |
| 8,300,438 | B1 * | 10/2012 | Herbert ............... | H02M 1/4216 363/124 |

(Continued)

FOREIGN PATENT DOCUMENTS

TW            I1382637  B1      1/2013

OTHER PUBLICATIONS

Office Action issued in corresponding Taiwanese Patent Application No. 102148300 on May 18, 2015, consisting of 16 pp.

(Continued)

*Primary Examiner* — Rajnikant Patel
(74) *Attorney, Agent, or Firm* — Volpe and Koenig, P.C.

(57) ABSTRACT

An AC/DC converter is disclosed. The proposed AC/DC converter generates an output voltage and includes a current ripple eliminator having an input terminal, an energy storage capacitor and an output terminal, wherein the input terminal has an input voltage, the output terminal generates a pure AC component of a voltage feedback signal based on the output voltage, when the input voltage is larger than a first reference voltage, the energy storage capacitor stores a difference between the input voltage and the first reference voltage as an electric energy, otherwise, the energy storage capacitor releases the electric energy to the input voltage, and an operational amplifier operating the AC component and a second reference voltage to determine when the storage capacitor should store or release the electric energy to minimize a ripple of an output power thereof.

18 Claims, 6 Drawing Sheets

(51) Int. Cl.
  *H02M 1/15* (2006.01)
  *H02M 1/42* (2007.01)
  *H05B 33/08* (2006.01)

(56) References Cited

U.S. PATENT DOCUMENTS

| | | | |
|---|---|---|---|
| 8,344,638 B2 * | 1/2013 | Shteynberg | H05B 33/0815 315/185 S |
| 8,477,514 B2 * | 7/2013 | Artusi | H02M 1/4225 363/21.01 |
| 8,742,674 B2 * | 6/2014 | Shteynberg | H05B 33/0815 315/201 |

OTHER PUBLICATIONS

Shu Wang, et al. "A Flicker-Free Electrolytic Capacitor-Less AC-DC LED Driver", IEEE trans. On Power Electronics, 2012, vol. 27, pp. 2318-2325.

Beibei Wang, et al. "A Method of Reducing the Peak-to-Average Ratio of LED Current for Electrolytic Capacitor-Less AC-DC Drivers", IEEE trans. On Power Electronics, 2010, vol. 25, pp. 592-601.

Kuan-Wen Lee, et al. "A Current Ripple Cancellation Circuit for Electrolytic Capacitor-Less AC-DC LED Driver", Applied Power Electronics Conference and Exposition, 2013, pp. 1058-1061.

* cited by examiner

ELECTROLYTIC CAPACITOR-LESS AC/DC CONVERTER AND CONTROLLING METHOD THEREOF

CROSS-REFERENCES TO RELATED APPLICATIONS

This application claims the benefits of Taiwan Patent Application Number 102148300 filed on Dec. 25, 2013, at the Taiwan Intellectual Property Office, the disclosures of which are incorporated herein in their entirety by reference.

FIELD OF THE INVENTION

The present invention relates to an electrolytic capacitor-less AC/DC converter and controlling method thereof, in particular to an electrolytic capacitor-less AC/DC converter including a current ripple eliminator and a voltage feedback control circuit.

BACKGROUND OF THE INVENTION

The conventional two-stage light emitting diode (LED) driver and one-stage light emitting diode (LED) driver both include electrolytic capacitors having large capacitance to act as an energy storage element so as to provide stable output power. The larger the capacitance employed, the smaller the low frequency (120 Hz) ripple components of the output voltage (current) are, and vise versa. If electrolytic capacitors having large capacitance are not used, then the output voltage (current) fluctuates, which results in a blinking light phenomenon.

Thus, how to avoid the drawbacks of causing fluctuation of the output voltage (current) and the resulting blinking light phenomenon when electrolytic capacitors with large capacitance are not used is worthy of further research and improvement.

Keeping the drawbacks of the prior art in mind, and through the use of robust and persistent experiments and research, the applicant has finally conceived of an electrolytic capacitor-less AC/DC converter and a controlling method thereof.

SUMMARY OF THE INVENTION

It is an objective of the present invention to provide an AC/DC converter including an output capacitor with a small capacitance and a long lifespan, and using a current ripple eliminator with a simple voltage feedback control such that a single-stage AC/DC PFC converter included in the proposed converter can achieve the requirement of having smaller output voltage (current) ripple components without using an electrolytic capacitor. The energy of the front stage of a conventional two-stage AC/DC converter can only be passed to the load through the rear stage. But, the proposed AC/DC converter includes the current ripple eliminator to deal with the ripple power part only, and it thus has high efficiency.

In accordance with the first aspect of the present invention, an AC/DC converter generates an output voltage and comprises an isolated PFC converter, a current ripple eliminator electrically connected to the isolated PFC converter in parallel, a first capacitor electrically connected to the current ripple eliminator in parallel, and a voltage feedback control circuit including a second capacitor having a first and a second terminals, wherein the first terminal receives a voltage feedback signal based on the output voltage, and the second terminal generates a pure AC component of the voltage feedback signal, and a first resistor having a first and a second terminals, wherein the first terminal of the first resistor receives a DC bias, the second terminal of the first resistor is electrically connected to the second terminal of the second capacitor, and outputs a control feedback signal including the DC bias and the pure AC component, and the control feedback signal is used to control an input power and an output power of the current ripple eliminator so as to minimize a ripple of an output power of the AC/DC converter.

In accordance with the second aspect of the present invention, an AC/DC converter receives an AC input voltage signal, generates an output voltage, and comprises a non-isolated PFC converter, a current ripple eliminator electrically connected to the non-isolated PFC converter in parallel, a first capacitor electrically connected to the current ripple eliminator in parallel, and a voltage feedback control circuit including a first voltage divider receiving the AC input voltage signal to generate a pure AC component of a voltage feedback signal based on the output voltage, and a first resistor having a first and a second terminals, wherein the first terminal receives a DC bias, the second terminal is electrically connected to the first voltage divider to cause the second terminal to output a control feedback signal including the DC bias and the pure AC component, and the control feedback signal is used to control an input power and an output power of the current ripple eliminator so as to minimize a ripple of an output power of the AC/DC converter.

In accordance with the third aspect of the present invention, an AC/DC converter generates an output voltage and comprises a single-stage PFC converter, a current ripple eliminator electrically connected to the PFC converter in parallel, and a voltage feedback control circuit including a DC block capacitor having a first and a second terminals, wherein the first terminal receives a voltage feedback signal based on the output voltage, the second terminal generates a pure AC component of the voltage feedback signal, and a buffer resistor having a first and a second terminals, wherein the first terminal of the buffer resistor receives a DC bias, and the second terminal of the buffer resistor is electrically connected to the second terminal of the DC block capacitor to cause the voltage feedback control circuit to output a control feedback signal including the pure AC component and the DC bias so as to minimize a ripple of an output power of the AC/DC converter.

In accordance with the fourth aspect of the present invention, an AC/DC converter receives an AC input voltage signal, generates an output voltage, and comprises a single-stage AC/DC PFC circuit, a current ripple eliminator electrically connected to the AC/DC PFC circuit in parallel, and a voltage feedback control circuit including a first voltage divider receiving the AC input voltage signal to generate a pure AC component of a voltage feedback signal based on the output voltage, and a buffer resistor having a first and a second terminals, wherein the first terminal receives a DC bias, and the second terminal is electrically connected to the first voltage divider to cause the voltage feedback control circuit to output a control feedback signal including the pure AC component and the DC bias so as to minimize a ripple of an output power of the AC/DC converter.

In accordance with the fifth aspect of the present invention, an AC/DC converter generates an output voltage and comprises a current ripple eliminator having an input terminal, an energy storage capacitor and an output terminal, wherein the input terminal has an input voltage, the output terminal generates a pure AC component of a voltage feedback signal based on the output voltage, when the input voltage is larger than a first reference voltage, the energy storage capacitor stores a difference between the input voltage and the first reference voltage as an electric energy, and when the input voltage is not larger than the first reference voltage, the energy storage capacitor releases the electric energy to the input voltage, and an operational amplifier operating the pure AC component and a second reference voltage to accurately determine when the energy storage capacitor should store or release the electric energy so as to minimize a ripple of an output power of the converter.

In accordance with the sixth aspect of the present invention, an AC/DC converter receives an AC input voltage and comprises a current ripple eliminator including a first inductor, and a switching circuit electrically connected to the first inductor in series and having a first capacitor, a first switching switch and a second switching switch, wherein the second switching switch is electrically connected to the first capacitor in series, the first switching switch is electrically connected to the series-connected second switching switch and the first capacitor in parallel, a duty ratio of the first switching switch=$1-2\omega(L_B \cdot C_B)^{(1/2)}$, where $\omega=2\pi f$, f is a working frequency of the AC input voltage, $L_B$ is an inductance of the first inductor, and $C_B$ is a capacitance of the first capacitor, and the duty ratio is a fixed value used to minimize a ripple of an output power of the converter.

In accordance with the seventh aspect of the present invention, a controlling method for an AC/DC converter comprises providing a single-stage AC/DC PFC circuit, a current ripple eliminator electrically connected to the PFC circuit in parallel, and a voltage feedback control circuit electrically connected to the current ripple eliminator in parallel; outputting a control feedback signal from the voltage feedback control circuit to the current ripple eliminator when a peak value of an output voltage of the single-stage AC/DC PFC circuit is not less than a predetermined value such that a first output current caused by the peak value of the output voltage higher than the predetermined value flows into the current ripple eliminator to generate a stored electric energy so as to cause an output voltage of the converter to equal the predetermined value; and outputting the control feedback signal from the voltage feedback control circuit to the current ripple eliminator when the peak value of the output voltage of the single-stage AC/DC PFC circuit is less than the predetermined value such that the stored electric energy generates a second output current flowing out the current ripple eliminator to cause the output voltage of the converter to equal the predetermined value.

In accordance with the eighth aspect of the present invention, a controlling method for an AC/DC converter comprises providing a current ripple eliminator having a first inductor and a switching circuit electrically connected to the first inductor in series, wherein the switching circuit has a first capacitor, a first switching switch and a second switching switch, the second switching switch is electrically connected to the first capacitor in series, and the first switching switch is electrically connected to the series-connected second switching switch and the first capacitor in parallel; and causing a duty ratio of the first switching switch=$1-2\omega(L_B \cdot C_B)^{(1/2)}$, where $\omega=2\pi f$, f is a working frequency of an AC input voltage of the converter, $L_B$ is an inductance of the first inductor, and $C_B$ is a capacitance of the first capacitor, and the duty ratio is a fixed value used to minimize a ripple of an output power of the converter.

BRIEF DESCRIPTION OF THE DRAWINGS

Other objectives, advantages and the efficacy of the present invention will be described in detail below taken from the preferred embodiments with reference to the accompanying drawings, in which.

DETAILED DESCRIPTION OF THE PREFERRED EMBODIMENT

The present invention will now be described more specifically with reference to the following embodiments. It is to be noted that the following descriptions of preferred embodiments of this invention are presented herein for purposes of illustration and description only; they are not intended to be exhaustive or to be limited to the precise form disclosed.

Figure 1:
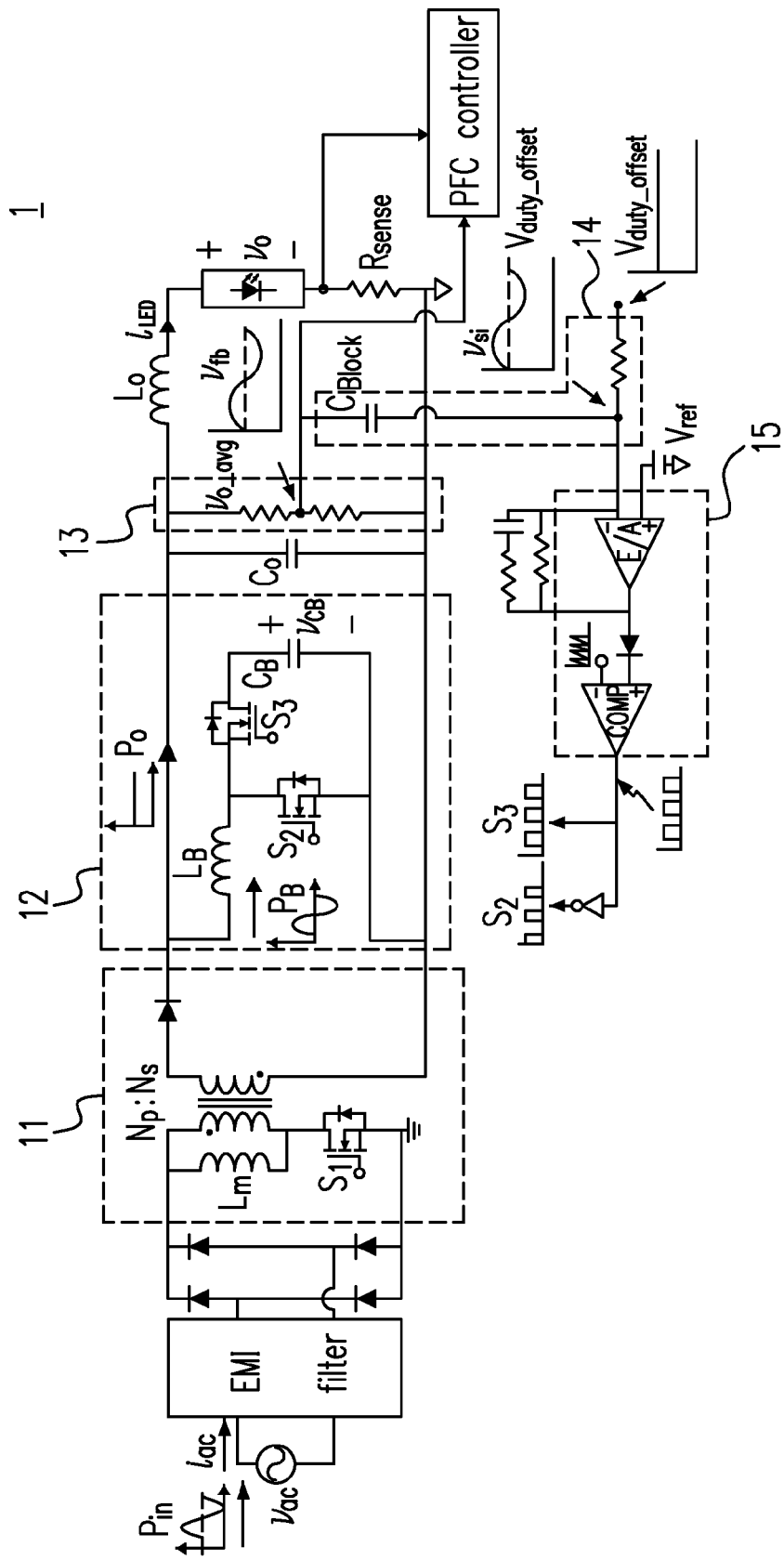
FIG. 1 is a schematic circuit diagram of an AC/DC converter according to the first preferred embodiment of the present invention.

FIG. 1 shows a schematic diagram of an AC/DC converter 1 according to the first preferred embodiment of the present invention. In FIG. 1, the AC/DC converter 1 includes an AC power source $V_{ac}$, an electromagnetic interference (EMI) filter, a rectifier, a first single-stage AC/DC PFC converter 11, a first current ripple eliminator 12, an output capacitor $C_O$, a first voltage divider 13, an output inductor $L_O$, an LED (it is a load), a sensing resistor $R_{sense}$, a PFC controller, a first voltage feedback control circuit 14, and a PWM controller 15. As shown in FIG. 1, the AC/DC converter 1 receives a current $I_{ac}$ from the power source $V_{ac}$, and has an input voltage $V_{in}$, the rectifier has four rectifying diodes, and the first single-stage AC/DC PFC converter 11 is a flyback converter. The flyback converter 11 has a first switch $S_1$, a magnetizing inductor $L_m$, and an isolation transformer (having a turns ratio of $N_p:N_s$). The first current ripple eliminator 12 has an input voltage $P_B$, an output voltage $P_O$, an inductor $L_B$, a second switch $S_2$, a third switch $S_3$ and a capacitor $C_B$. The first voltage divider 13 has two resistors, and outputs a voltage division feedback signal $V_{fb}$, which has a DC component of $V_{O\_avg}$. The PWM controller 15 has an operational amplifier E/A and a comparator COMP, and the PWM controller 15 outputs a first gate control signal (from the output terminal of the COMP) transferring to the control terminal of the second switch $S_2$, and a second gate control signal (from the output terminal of the COMP and then via a NOT gate to generate) transferring to the control terminal of the third switch $S_3$ to control the turn-on and the turn-off of the two switches $S_2$ and $S_3$. The capacitor $C_O$ in FIG. 1 employs a capacitor having a small capacitance and a long lifespan to replace the electrolytic capacitor, and a first current ripple eliminator 12 with a simple voltage feedback control is used such that the first single-stage AC/DC PFC converter 11 can achieve the requirement of having smaller output voltage (current) ripple components without using an electrolytic capacitor. The energy of the front stage of conventional two-stage AC/DC converter can only be passed to the load through the rear stage, and the proposed AC/DC converter (e.g., 1) includes the current ripple eliminator (e.g., 12) to deal with the ripple power part only, and thus to have high efficiency.

In FIG. 1, the current ripple eliminator 12 has a configuration of bi-directional boost converter, and achieves the stable output voltage (current) via adjusting the duty ratio or the duty cycle of the switch S2 to control the magnitude of the input/output power so as to balance the output power. In the conventional approach to control the current ripple eliminator, the feedback of the output current component is required and a more complex extra circuit and with a higher cost is needed. In the present invention, the proposed control method employs the voltage feedback signal originally included in the AC/DC PFC converter to control the current ripple eliminator, and the control scheme is simple. The voltage division feedback of the output voltage is $V_{fb}$, goes through a DC block capacitor to be filtered as a pure AC component, then adds a preset DC bias $V_{Duty\text{-}offset}$ to become a control feedback signal $V_{si}$ so as to provide to a common PWM controller to accomplish the control. The AC component of $V_{fb}$ is used to control the magnitude of the duty ratio of the switches S2 and S3 to adjust the input and the output powers of the current ripple eliminator. The $V_{Duty\text{-}offset}$ is used to set a reasonable DC bias to cause the $V_{si}$ to be compared with $V_{ref}$ of the PWM controller 15 to get the exact magnitude of the signal. The $V_{Duty\text{-}Offset}$ can be generated via the voltage division of the built-in reference voltage level of the common PWM controller, there is no complex feedback circuit required, and $V_{ref}$ is the bias inside the comparator.

Figure 2:
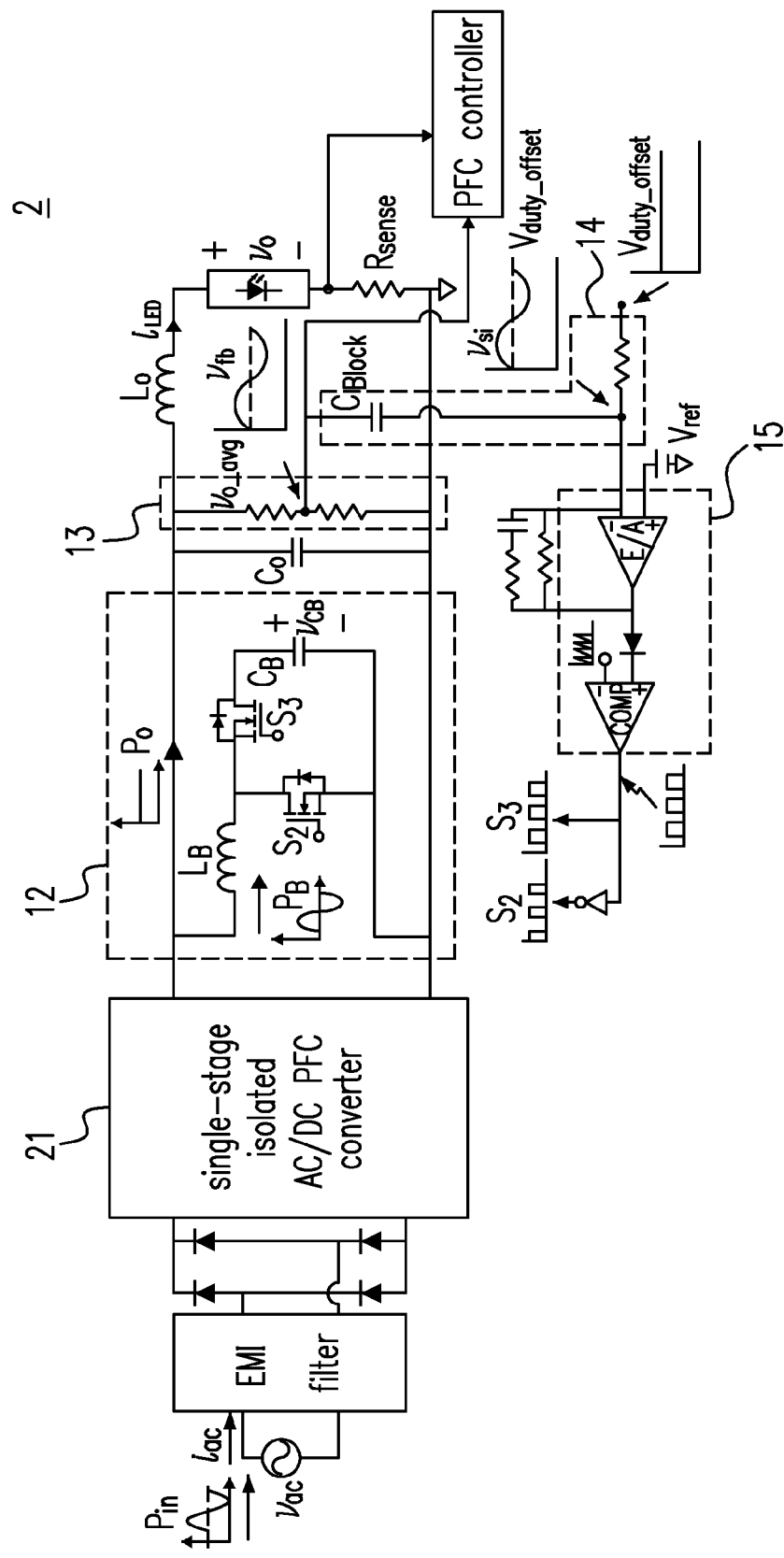
FIG. 2 is a schematic circuit diagram of an AC/DC converter according to the second preferred embodiment of the present invention.

FIG. 2 shows a schematic diagram of an AC/DC converter 2 according to the second preferred embodiment of the present invention. FIG. 2 is a preferred embodiment of electrolytic capacitor-less LED driver employing the proposed controlling method to the single-stage isolated AC/DC PFC converter 21 except for the flyback converter 11. FIG. 2 is a preferred embodiment adapting the first voltage feedback control circuit 14 and the first current ripple eliminator 12 above to the single-stage isolated AC/DC PFC converter 21. Certainly, the applicable AC/DC PFC converters are not limited to the flyback converter 11, or other single-stage isolated AC/DC PFC converter 21, and a non-isolated PFC converter can be used also (described as follows). The single-stage isolated AC/DC PFC converter 21 can be, for example, a forward converter.

Figure 3:
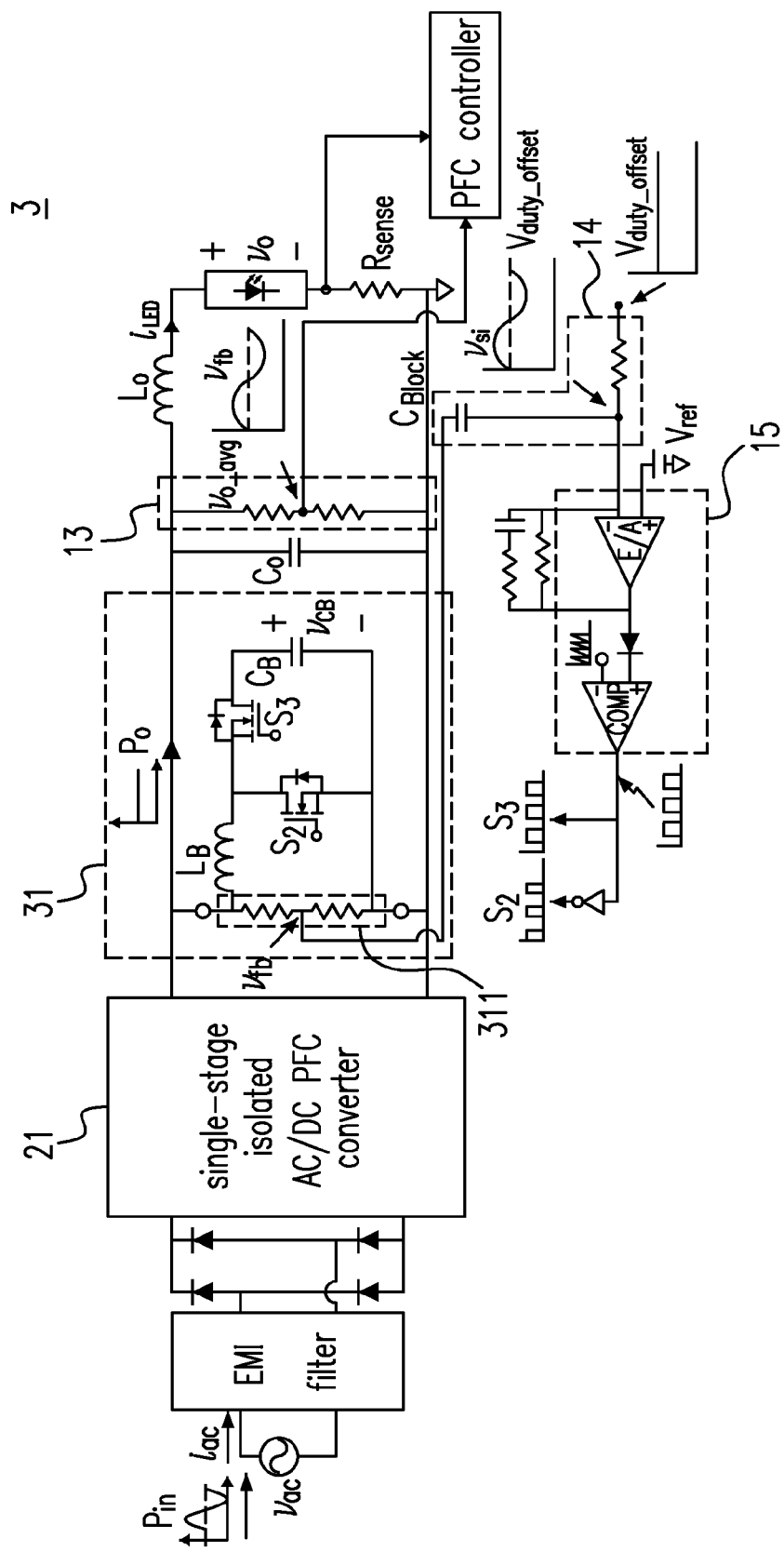
FIG. 3 is a schematic circuit diagram of an AC/DC converter according to the third preferred embodiment of the present invention.

FIG. 3 shows a schematic circuit diagram of an AC/DC converter 3 according to the third preferred embodiment of the present invention. FIG. 3 is a configuration that the voltage feedback control circuit and the current ripple eliminator has been modulized, which includes the first voltage feedback control circuit 14, the PWM controller 15, and a second current ripple eliminator 31 (including an extra second voltage divider 311). This module 31 is a simple two-terminal element, can be used to replace the electrolytic capacitor with a large capacitance at the rear side of a conventional AC/DC PFC converter, has the capability to be quickly replaced, and can raise the availability of the whole system.

Figure 4:
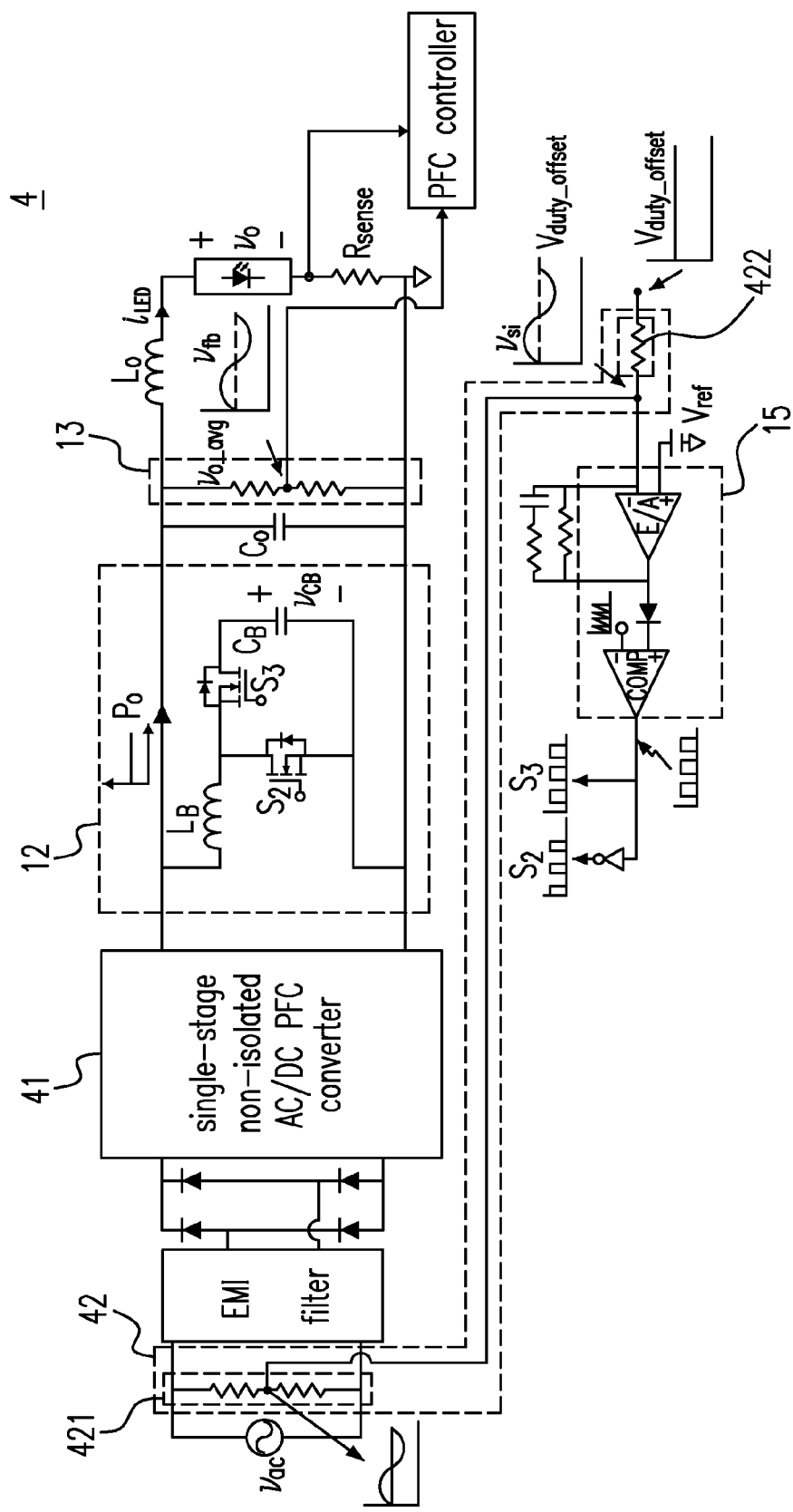
FIG. 4 is a schematic circuit diagram of an AC/DC converter according to the fourth preferred embodiment of the present invention.

FIG. 4 shows a schematic circuit diagram of an AC/DC converter 4 according to the fourth preferred embodiment of the present invention. FIGS. 1 to 3 are embodiments of the present invention applied to AC/DC converters, and FIG. 4 is an embodiment of the present invention applied to a single-stage non-isolated AC/DC PFC converter 41. As shown in FIG. 4, the differences between the AC/DC converter 4 and the AC/DC converters 1, 2 and 3 above are that the AC/DC converter 4 includes a single-stage non-isolated AC/DC PFC converter 41 and a second voltage feedback control circuit 42, and the second voltage feedback control circuit 42 includes a third voltage divider 421 and a buffer resistor 422. Because the input terminal and the output terminal therein have a common-ground relationship, the voltage feedback control signal can be obtained directly from the voltage division of the ripple voltage $V_{ac}$ of the input terminal, and the capacitor $C_{Block}$ in FIGS. 1 to 3 can be omitted.

Figure 5:
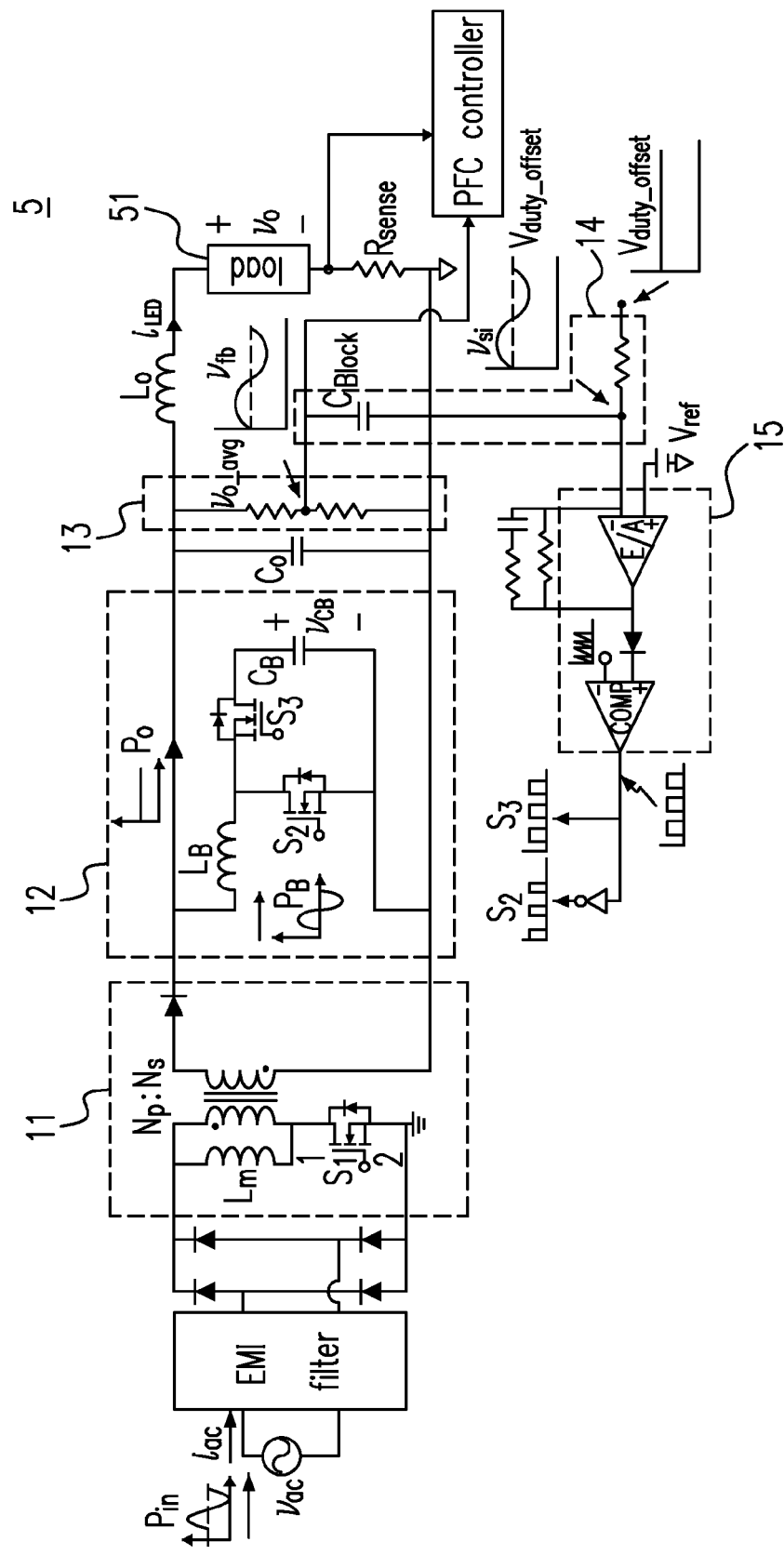
FIG. 5 is a schematic circuit diagram of an AC/DC converter according to the fifth preferred embodiment of the present invention.

The LED load in FIGS. 1 to 4 can be change to a non-LED load. FIG. 5 shows a schematic circuit diagram of an AC/DC converter 5 according to the fifth preferred embodiment of the present invention, wherein the difference between the AC/DC converter 5 and the AC/DC converter 1 of FIG. 1 is that the load of the AC/DC converter 5 is not limited to an LED. Thus, this configuration 5 can be used to drive other kinds of loads (51), which require a stable output voltage (current), and can be adapted for use in the configurations of FIGS. 1 to 4.

Figure 6:
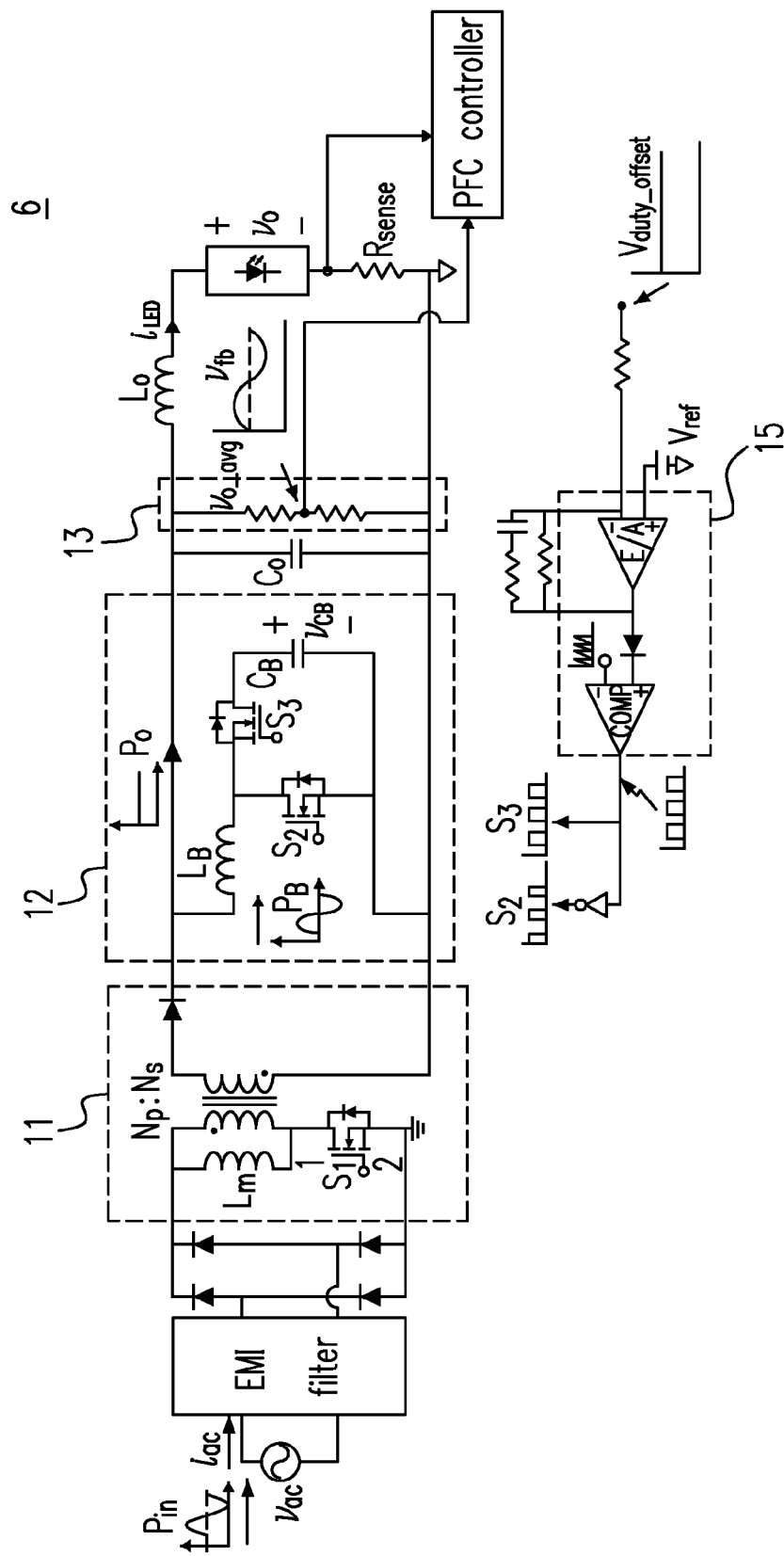
FIG. 6 is a schematic circuit diagram of an AC/DC converter according to the sixth preferred embodiment of the present invention.

FIG. 6 shows a schematic circuit diagram of an AC/DC converter 6 according to the sixth preferred embodiment of the present invention. The control approach employed in FIG. 6 does not receive the voltage feedback, and uses a fixed duty ratio to control switches S2 and S3 (because S2 and S3 are complementarily conducted to each other, only the duty ratio of S2 is required to be controlled), can be viewed as an open-loop control, and has the advantage of having even more simplified configuration. The differences between FIG. 6 and FIGS. 1 to 5 are that FIG. 6 does not have the first/the second voltage feedback control circuits 14/42 in FIGS. 1 to 5 because the fixed duty ratio is used. The control approach employed in FIG. 6 requires a larger inductance of the boost inductor $L_B$ and a larger capacitance of the boost capacitor $C_B$ than those required by the control approaches used in FIGS. 1 to 5. When the control approach in FIG. 6 is used:

$$i_{CB}(t) = C_B \cdot \frac{dv_{CB}(t)}{dt} \text{ and} \quad (1)$$

$$v_{LB}(t) = L_B \cdot \frac{di_{CB}(t)}{dt}, \quad (2)$$

where $i_{CB}(t)$ is the current flowing from $S_3$ and going through the boost capacitor $C_B$, $v_{LB}(t)$ is the cross voltage across the two terminals of the boost inductor $L_B$, $C_B$ is the capacitance of the capacitor $C_B$, $L_B$ is the inductance of the inductor $L_B$, $v_{CB}(t)$ is the cross voltage across the two terminals of the boost capacitor $C_B$, $i_{LB}(t)$ is the current flowing through $L_B$. And, $v_{LB}(t)$ can be also expressed as:

$$v_{LB}(t) = Vo - v_{S2}(t) = Vo - (1 - D_{S2})v_{CB}(t) \quad (3)$$

where Vo is the output voltage of the AC/DC converter 6, $V_{S2}(t)$ is the voltage at the electrical connection node between the inductor $L_B$ and the switch $S_2$, $D_{S2}$ is the duty ratio of $S_2$, the optimized fixed duty ratio $D_{S2,opt}$ can be derived by assuming that the AC component $i_s(t)$ of the current flowing out the secondary side of the AC/DC PFC converter 11 is all flowing into the current ripple eliminator 12 (it is the current flowing through the inductor $L_B$).

$$i_{LB}(t) = i_s(t) = I_O \sin(2\omega t) \quad (4),$$

where $I_O$ is the amplitude of the output current of the AC/DC converter 6, $\omega$ is the angle frequency of the input voltage.

And, $i_{CB}(t)$ can also be expressed as:

$$i_{CB}(t) = (1 - D_{S2,opt}) \cdot I_O \sin(2\omega t) \quad (5).$$

When formulas (4) and (3) are substituted into formula (2), $v_{CB}(t)$ can be expressed as:

$$V_O - (1 - D_{S2,opt})v_{CB}(t) = \quad (6)$$

$$L_B \cdot [2\omega I_O \cos(2\omega t)] \to v_{CB}(t) = \frac{V_O - 2\omega L_B I_O \cos(2\omega t)}{(1 - D_{S2,opt})}.$$

When formulas (5) and (6) are substituted into formula (1), we get:

$$(1 - D_{S2,opt}) \cdot I_O \sin(2\omega t) = C_B \cdot \frac{1}{(1 - D_{S2,opt})} \cdot [4\omega^2 L_B I_O \sin(2\omega t)] \quad (7)$$

After rearranging formula (7), we get:

$$(1 - D_{S2,opt})^2 = 4\omega^2 \cdot L_B \cdot C_B \quad (8).$$

And we know: $D_{S2,opt} = 1 - 2\omega(L_B \cdot C_B)^{(1/2)}$ (9), where $\omega = 2\pi f$, f is a working frequency of the input voltage $V_{ac}$.

Embodiments

1. An AC/DC converter generating an output voltage and comprising:
    an isolated PFC converter;
    a current ripple eliminator electrically connected to the isolated PFC converter in parallel;
    a first capacitor electrically connected to the current ripple eliminator in parallel; and
    a voltage feedback control circuit including:
        a second capacitor having a first and a second terminals, wherein the first terminal receives a voltage feedback signal based on the output voltage, and the second terminal generates a pure AC component of the voltage feedback signal; and
    a first resistor having a first and a second terminals, wherein the first terminal of the first resistor receives a DC bias, the second terminal of the first resistor is electrically connected to the second terminal of the second capacitor, and outputs a control feedback signal including the DC bias and the pure AC component, and the control feedback signal is used to control an input power and an output power of the current ripple eliminator so as to minimize a ripple of an output power of the AC/DC converter.

2. The AC/DC converter according to Embodiment 1, further comprising a voltage divider, a power factor correction (PFC) controller and a pulse width modulation (PWM) controller, wherein the DC bias is generated by a voltage division of a built-in reference voltage level of the PWM controller, the isolated PFC converter has a first switching switch, the first capacitor is a non-electrolytic capacitor, the second capacitor is a DC block capacitor, the current ripple eliminator has a second switching switch and a third switching switch, the voltage divider is electrically connected to the non-electrolytic capacitor in parallel, and outputs the voltage feedback signal, the PFC controller receives the voltage feedback signal to be used to control magnitudes of a first duty cycle of the second switching switch, and a second duty cycle of the third switching switch so as to respectively control the input power and the output power, and the isolated PFC converter is an isolated AC/DC PFC converter.

3. The AC/DC converter according to Embodiment 1 or 2, wherein the isolated AC/DC PFC converter is one of a flyback converter and a forward converter.

4. The AC/DC converter according to any one of the above-mentioned Embodiments, wherein the PWM controller generates a first and a second control signals to control the first duty ratio of the second switching switch and the second duty ratio of the third switching switch, the isolated PFC converter has a first and a second output terminals, each of the second and the third switching switches has a first, a second, and a control terminals, the current ripple eliminator further includes a first inductor having a first and a second terminals, and a third capacitor having a first and a second terminals, the first terminal of the first inductor is electrically connected to the first output terminal of the isolated PFC converter, the second terminal of the first inductor is electrically connected to the first terminal of the second switching switch and the second terminal of the third switching switch, the first terminal of the first switching switch is electrically connected to the first terminal of the third capacitor, the second terminal of the third capacitor is electrically connected to the second terminal of the second switching switch and the second output terminal of the isolated PFC converter, the control terminal of the second switching switch receives the first control signal, and the control terminal of the third switching switch receives the second control signal.

5. The AC/DC converter according to any one of the above-mentioned Embodiments, further comprising a second inductor, a load and a second resistor, wherein each of the non-electrolytic capacitor, the second inductor, the load and the second resistor has a first and a second terminals, the first terminal of the second inductor is electrically connected to the first terminal of the non-electrolytic capacitor and the first output terminal of the isolated PFC converter, the second terminal of the second inductor is electrically connected to the first terminal of the load, the second terminal of the load is electrically connected to the first terminal of the second resistor and the PFC controller, and the second terminal of the second resistor is electrically connected to the second output terminal of the isolated PFC converter and a common ground.

6. An AC/DC converter receiving an AC input voltage signal, generating an output voltage, and comprising:
    a non-isolated PFC converter;
    a current ripple eliminator electrically connected to the non-isolated PFC converter in parallel;
    a first capacitor electrically connected to the current ripple eliminator in parallel; and
    a voltage feedback control circuit including:
        a first voltage divider receiving the AC input voltage signal to generate a pure AC component of a voltage feedback signal based on the output voltage; and a first resistor having a first and a second terminals, wherein the
        first terminal receives a DC bias, the second terminal is electrically connected to the first voltage divider to cause the second terminal to output a control feedback signal including the DC bias and the pure AC component, and the control feedback signal is used to control an input power and an output power of the current ripple eliminator so as to minimize a ripple of an output power of the AC/DC converter.

7. The AC/DC converter according to Embodiment 6, further comprising a first and a second input terminals and a first and a second output terminals, wherein the non-isolated PFC converter is a non-isolated AC/DC PFC converter, and the second input terminal and the second output terminal of the AC/DC converter have a common ground.

8. The AC/DC converter according to Embodiment 6 or 7, wherein the non-isolated AC/DC PFC converter is one selected from a group consisting of a buck converter, a boost converter, a buck-boost converter, a Cuk converter, a Sepic converter, and a Zeta converter.

9. An AC/DC converter generating an output voltage and comprising:
a single-stage PFC converter;
a current ripple eliminator electrically connected to the PFC converter in parallel; and
a voltage feedback control circuit including:
a DC block capacitor having a first and a second terminals, wherein the first terminal receives a voltage feedback signal based on the output voltage, the second terminal generates a pure AC component of the voltage feedback signal; and
a buffer resistor having a first and a second terminals, wherein the first terminal of the buffer resistor receives a DC bias, and the second terminal of the buffer resistor is electrically connected to the second terminal of the DC block capacitor to cause the voltage feedback control circuit to output a control feedback signal including the pure AC component and the DC bias so as to minimize a ripple of an output power of the AC/DC converter.

10. The AC/DC converter according to Embodiment 9, wherein the single-stage PFC converter is a single-stage AC/DC PFC converter.

11. An AC/DC converter receiving an AC input voltage signal, generating an output voltage, and comprising:
a single-stage AC/DC PFC circuit;
a current ripple eliminator electrically connected to the AC/DC PFC circuit in parallel; and
a voltage feedback control circuit including:
a first voltage divider receiving the AC input voltage signal to generate a pure AC component of a voltage feedback signal based on the output voltage; and
a buffer resistor having a first and a second terminals, wherein the first terminal receives a DC bias, and the second terminal is electrically connected to the first voltage divider to cause the voltage feedback control circuit to output a control feedback signal including the pure AC component and the DC bias so as to minimize a ripple of an output power of the AC/DC converter.

12. An AC/DC converter generating an output voltage and comprising:
a current ripple eliminator having an input terminal, an energy storage capacitor and an output terminal, wherein the input terminal has an input voltage, the output terminal generates a pure AC component of a voltage feedback signal based on the output voltage, when the input voltage is larger than a first reference voltage, the energy storage capacitor stores a difference between the input voltage and the first reference voltage as an electric energy, and when the input voltage is not larger than the first reference voltage, the energy storage capacitor releases the electric energy to the input voltage; and
an operational amplifier operating the pure AC component and a second reference voltage to accurately determine when the energy storage capacitor should store or release the electric energy so as to minimize a ripple of an output power of the converter.

13. The AC/DC converter according to Embodiment 12, further comprising a voltage divider and a non-electrolytic capacitor, wherein the output terminal includes a first terminal and a second terminal, the voltage divider and the non-electrolytic capacitor are electrically connected to the first and the second terminals in parallel, and the voltage divider generates the voltage feedback signal.

14. An AC/DC converter receiving an AC input voltage and comprising:
a current ripple eliminator including:
a first inductor; and
a switching circuit electrically connected to the first inductor in series and having a first capacitor, a first switching switch and a second switching switch, wherein the second switching switch is electrically connected to the first capacitor in series, the first switching switch is electrically connected to the series-connected second switching switch and the first capacitor in parallel, a duty ratio of the first switching switch=$1-2\omega(L_B \cdot C_B)^{(1/2)}$, where $\omega=2\pi f$, f is a working frequency of the AC input voltage, $L_B$ is an inductance of the first inductor, and $C_B$ is a capacitance of the first capacitor, and the duty ratio is a fixed value used to minimize a ripple of an output power of the converter.

15. The AC/DC converter according to Embodiment 14, further comprising a single-stage AC/DC PFC circuit and a non-electrolytic capacitor, wherein each of the current ripple eliminator, the first inductor, the first capacitor, the first switching switch and the second switching switch has a first and a second terminals, the first terminal of the first inductor is electrically connected to the first terminal of the current ripple eliminator, the second terminal of the first inductor is electrically connected to the first terminal of the first switching switch and the second terminal of the second switching switch, the first terminal of the second switching switch is electrically connected to the first terminal of the first capacitor, the second terminal of the first capacitor is electrically connected to the second terminal of the first switching switch and the second terminal of the current ripple eliminator, the single-stage AC/DC PFC circuit and the non-electrolytic capacitor are electrically connected to the first and the second terminals of the current ripple eliminator in parallel, the duty ratio is used to control a turn-on and a turn-off of the first switching switch, and the first switching switch and the second switching switch are complementarily turned on and turned off to each other in the same period, wherein in the same period, when the first switching switch is turned on, the second switching switch is turned off, and when the first switching switch is turned off, the second switching switch is turned on, a minimum cross voltage of the first capacitor is larger than an input voltage of the current ripple eliminator, and a maximum cross voltage of the first capacitor is less than a rated voltage of the first capacitor.

16. A controlling method for an AC/DC converter, comprising:
providing a single-stage AC/DC PFC circuit, a current ripple eliminator electrically connected to the AC/DC PFC circuit in parallel, and a voltage feedback control circuit electrically connected to the current ripple eliminator in parallel;
outputting a control feedback signal from the voltage feedback control circuit to the current ripple eliminator when a peak value of an output voltage of the single-stage AC/DC PFC circuit is not less than a predetermined value such that a first output current caused by the peak value of the output voltage higher than the predetermined value flows into the current ripple eliminator to generate a stored electric energy so as to cause an output voltage of the converter to equal the predetermined value; and
outputting the control feedback signal from the voltage feedback control circuit to the current ripple eliminator when the peak value of the output voltage of the single-stage AC/DC PFC circuit is less than the predetermined value such that the stored electric energy generates a second output current flowing out the current ripple eliminator to cause the output voltage of the converter to equal the predetermined value.

17. The controlling method according to Embodiment 16, wherein the AC/DC converter is the AC/DC converter as disclosed in one of Embodiment 5 and Embodiment 7.

18. A controlling method for an AC/DC converter, comprising:
providing a current ripple eliminator having a first inductor and a switching circuit electrically connected to the first inductor in series, wherein the switching circuit has a first capacitor, a first switching switch and a second switching switch, the second switching switch is electrically connected to the first capacitor in series, and the first switching switch is electrically connected to the series-connected second switching switch and the first capacitor in parallel; and
causing a duty ratio of the first switching switch=1−2ω$(L_B \cdot C_B)^{(1/2)}$, where ω=2πf, f is a working frequency of an AC input voltage of the converter, $L_B$ is an inductance of the first inductor, and $C_B$ is a capacitance of the first capacitor, and the duty ratio is a fixed value used to minimize a ripple of an output power of the converter.

According to the descriptions above, the present invention discloses an AC/DC converter including an output capacitor with a small capacitance and a long lifespan, and using a current ripple eliminator with a simple voltage feedback control such that a single-stage AC/DC PFC converter included in the proposed converter can achieve the requirement of having a smaller output voltage (current) ripple components without using an electrolytic capacitor. The energy of the front stage of conventional two-stage AC/DC converter can only be passed to the load through the rear stage. But, the proposed AC/DC converter includes the current ripple eliminator to deal with the ripple power part only, and thus has high efficiency.

While the invention has been described in terms of what is presently considered to be the most practical and preferred embodiments, it is to be understood that the invention needs not be limited to the disclosed embodiments. Therefore, it is intended to cover various modifications and similar configuration included within the spirit and scope of the appended claims, which are to be accorded with the broadest interpretation so as to encompass all such modifications and similar structures.

What is claimed is:

1. An AC/DC converter generating an output voltage and comprising:
an isolated PFC converter;
a current ripple eliminator electrically connected to the isolated PFC converter in parallel;
a first capacitor electrically connected to the current ripple eliminator in parallel; and
a voltage feedback control circuit including:
a second capacitor having a first and a second terminals, wherein the first terminal receives a voltage feedback signal based on the output voltage, and the second terminal generates a pure AC component of the voltage feedback signal; and
a first resistor having a first and a second terminals, wherein the first terminal of the first resistor receives a DC bias, the second terminal of the first resistor is electrically connected to the second terminal of the second capacitor, and outputs a control feedback signal including the DC bias and the pure AC component, and the control feedback signal is used to control an input power and an output power of the current ripple eliminator so as to minimize a ripple of an output power of the AC/DC converter.

2. The AC/DC converter according to claim 1, further comprising a voltage divider, a power factor correction (PFC) controller and a pulse width modulation (PWM) controller, wherein the DC bias is generated by a voltage division of a built-in reference voltage level of the PWM controller, the isolated PFC converter has a first switching switch, the first capacitor is a non-electrolytic capacitor, the second capacitor is a DC block capacitor, the current ripple eliminator has a second switching switch and a third switching switch, the voltage divider is electrically connected to the non-electrolytic capacitor in parallel, and outputs the voltage feedback signal, the PFC controller receives the voltage feedback signal to be used to control magnitudes of a first duty cycle of the second switching switch, and a second duty cycle of the third switching switch so as to respectively control the input power and the output power, and the isolated PFC converter is an isolated AC/DC PFC converter.

3. The AC/DC converter according to claim 2, wherein the isolated AC/DC PFC converter is one of a flyback converter and a forward converter.

4. The AC/DC converter according to claim 2, wherein the PWM controller generates a first and a second control signals to control the first duty ratio of the second switching switch and the second duty ratio of the third switching switch, the isolated PFC converter has a first and a second output terminals, each of the second and the third switching switches has a first, a second, and a control terminals, the current ripple eliminator further includes a first inductor having a first and a second terminals, and a third capacitor having a first and a second terminals, the first terminal of the first inductor is electrically connected to the first output terminal of the isolated PFC converter, the second terminal of the first inductor is electrically connected to the first terminal of the second switching switch and the second terminal of the third switching switch, the first terminal of the first switching switch is electrically connected to the first terminal of the third capacitor, the second terminal of the third capacitor is electrically connected to the second terminal of the second switching switch and the second output terminal of the isolated PFC converter, the control terminal of the second switching switch receives the first control signal, and the control terminal of the third switching switch receives the second control signal.

5. The AC/DC converter according to claim 4, further comprising a second inductor, a load and a second resistor, wherein each of the non-electrolytic capacitor, the second inductor, the load and the second resistor has a first and a second terminals, the first terminal of the second inductor is electrically connected to the first terminal of the non-electrolytic capacitor and the first output terminal of the isolated PFC converter, the second terminal of the second inductor is electrically connected to the first terminal of the load, the second terminal of the load is electrically connected to the first terminal of the second resistor and the PFC controller, and the second terminal of the second resistor is electrically connected to the second output terminal of the isolated PFC converter and a common ground.

6. An AC/DC converter receiving an AC input voltage signal, generating an output voltage, and comprising:
a non-isolated PFC converter;
a current ripple eliminator electrically connected to the non-isolated PFC converter in parallel;
a first capacitor electrically connected to the current ripple eliminator in parallel; and
a voltage feedback control circuit including:
a first voltage divider receiving the AC input voltage signal to generate a pure AC component of a voltage feedback signal based on the output voltage; and
a first resistor having a first and a second terminals, wherein the first terminal receives a DC bias, the second terminal is electrically connected to the first voltage divider to cause the second terminal to output a control feedback signal including the DC bias and the pure AC component, and the control feedback signal is used to control an input power and an output power of the current ripple eliminator so as to minimize a ripple of an output power of the AC/DC converter.

7. The AC/DC converter according to claim 6, further comprising a first and a second input terminals and a first and a second output terminals, wherein the non-isolated PFC converter is a non-isolated AC/DC PFC converter, and the second input terminal and the second output terminal of the AC/DC converter have a common ground.

8. The AC/DC converter according to claim 7, wherein the non-isolated AC/DC PFC converter is one selected from a group consisting of a buck converter, a boost converter, a buck-boost converter, a Cuk converter, a Sepic converter, and a Zeta converter.

9. An AC/DC converter generating an output voltage and comprising:
a single-stage PFC converter;
a current ripple eliminator electrically connected to the PFC converter in parallel; and
a voltage feedback control circuit including:
a DC block capacitor having a first and a second terminals, wherein the first terminal receives a voltage feedback signal based on the output voltage, the second terminal generates a pure AC component of the voltage feedback signal; and
a buffer resistor having a first and a second terminals, wherein the first terminal of the buffer resistor receives a DC bias, and the second terminal of the buffer resistor is electrically connected to the second terminal of the DC block capacitor to cause the voltage feedback control circuit to output a control feedback signal including the pure AC component and the DC bias so as to minimize a ripple of an output power of the AC/DC converter.

10. The AC/DC converter according to claim 9, wherein the single-stage PFC converter is a single-stage AC/DC PFC converter.

11. An AC/DC converter receiving an AC input voltage signal, generating an output voltage, and comprising:
a single-stage AC/DC PFC circuit;
a current ripple eliminator electrically connected to the AC/DC PFC circuit in parallel; and
a voltage feedback control circuit including:
a first voltage divider receiving the AC input voltage signal to generate a pure AC component of a voltage feedback signal based on the output voltage; and
a buffer resistor having a first and a second terminals, wherein the first terminal receives a DC bias, and the second terminal is electrically connected to the first voltage divider to cause the voltage feedback control circuit to output a control feedback signal including the pure AC component and the DC bias so as to minimize a ripple of an output power of the AC/DC converter.

12. An AC/DC converter generating an output voltage and comprising:
a current ripple eliminator having an input terminal, an energy storage capacitor and an output terminal, wherein the input terminal has an input voltage, the output terminal generates a pure AC component of a voltage feedback signal based on the output voltage, when the input voltage is larger than a first reference voltage, the energy storage capacitor stores a difference between the input voltage and the first reference voltage as an electric energy, and when the input voltage is not larger than the first reference voltage, the energy storage capacitor releases the electric energy to the input voltage; and
an operational amplifier operating the pure AC component and a second reference voltage to accurately determine when the energy storage capacitor should store or release the electric energy so as to minimize a ripple of an output power of the converter.

13. The AC/DC converter according to claim 12, further comprising a voltage divider and a non-electrolytic capacitor, wherein the output terminal includes a first terminal and a second terminal, the voltage divider and the non-electrolytic capacitor are electrically connected to the first and the second terminals in parallel, and the voltage divider generates the voltage feedback signal.

14. An AC/DC converter receiving an AC input voltage and comprising:
a current ripple eliminator including:
a first inductor; and
a switching circuit electrically connected to the first inductor in series and having a first capacitor, a first switching switch and a second switching switch, wherein the second switching switch is electrically connected to the first capacitor in series, the first switching switch is electrically connected to the series-connected second switching switch and the first capacitor in parallel, a duty ratio of the first switching switch=$1-2\omega(L_B \cdot C_B)^{(1/2)}$, where $\omega=2\pi f$, f is a working frequency of the AC input voltage, $L_B$ is an inductance of the first inductor, and $C_B$ is a capacitance of the first capacitor, and the duty ratio is a fixed value used to minimize a ripple of an output power of the converter.

15. The AC/DC converter according to claim 14, further comprising a single-stage AC/DC PFC circuit and a non-electrolytic capacitor, wherein each of the current ripple eliminator, the first inductor, the first capacitor, the first switching switch and the second switching switch has a first and a second terminals, the first terminal of the first inductor is electrically connected to the first terminal of the current ripple eliminator, the second terminal of the first inductor is electrically connected to the first terminal of the first switching switch and the second terminal of the second switching switch, the first terminal of the second switching switch is electrically connected to the first terminal of the first capacitor, the second terminal of the first capacitor is electrically connected to the second terminal of the first switching switch and the second terminal of the current ripple eliminator, the single-stage AC/DC PFC circuit and the non-electrolytic capacitor are electrically connected to the first and the second terminals of the current ripple eliminator in parallel, the duty ratio is used to control a turn-on and a turn-off of the first switching switch, and the first switching switch and the second switching switch are complementarily turned on and turned off to each other in the same period, wherein in the same period, when the first switching switch is turned on, the second switching switch is turned off, and when the first switching switch is turned off, the second switching switch is turned on, a minimum cross voltage of the first capacitor is larger than an input voltage of the current ripple eliminator, and a maximum cross voltage of the first capacitor is less than a rated voltage of the first capacitor.

16. A controlling method for an AC/DC converter, comprising:

providing a single-stage AC/DC PFC circuit, a current ripple eliminator electrically connected to the AC/DC PFC circuit in parallel, and a voltage feedback control circuit electrically connected to the current ripple eliminator in parallel;

outputting a control feedback signal from the voltage feedback control circuit to the current ripple eliminator when a peak value of an output voltage of the single-stage AC/DC PFC circuit is not less than a predetermined value such that a first output current caused by the peak value of the output voltage higher than the predetermined value flows into the current ripple eliminator to generate a stored electric energy so as to cause an output voltage of the converter to equal the predetermined value; and outputting the control feedback signal from the voltage feedback control circuit to the current ripple eliminator when the peak value of the output voltage of the single-stage AC/DC PFC circuit is less than the predetermined value such that the stored electric energy generates a second output current flowing out the current ripple eliminator to cause the output voltage of the converter to equal the predetermined value.

17. The controlling method according to claim 16, wherein the AC/DC converter is the AC/DC converter as claimed in one of claim 5 and claim 7.

18. A controlling method for an AC/DC converter, comprising:

providing a current ripple eliminator having a first inductor and a switching circuit electrically connected to the first inductor in series, wherein the switching circuit has a first capacitor, a first switching switch and a second switching switch, the second switching switch is electrically connected to the first capacitor in series, and the first switching switch is electrically connected to the series-connected second switching switch and the first capacitor in parallel; and causing a duty ratio of the first switching switch=$1-2\omega(L_B \cdot C_B)^{(1/2)}$, where $\omega=2\pi f$, f is a working frequency of an AC input voltage of the converter, $L_B$ is an inductance of the first inductor, and $C_B$ is a capacitance of the first capacitor, and the duty ratio is a fixed value used to minimize a ripple of an output power of the converter.

* * * * *